Figure 1:
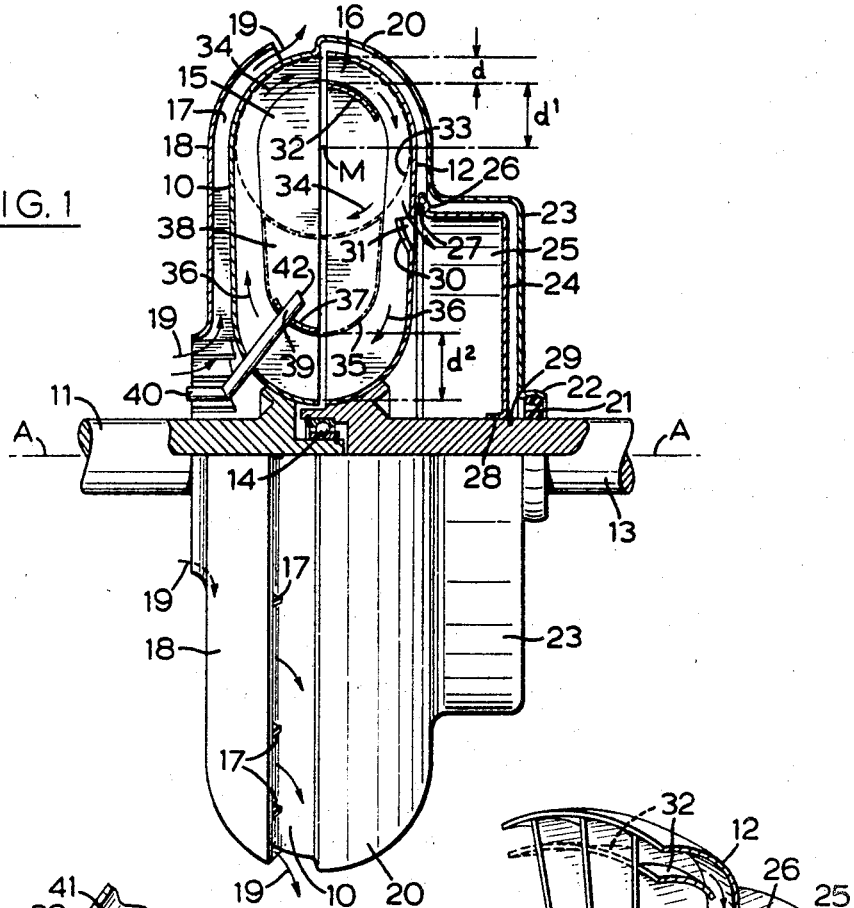

Sept. 3, 1968 J. E. BECKER 3,399,533
VENTED HYDRAULIC COUPLING

Filed Nov. 4, 1966 2 Sheets-Sheet 1

Sept. 3, 1968   J. E. BECKER   3,399,533
VENTED HYDRAULIC COUPLING
Filed Nov. 4, 1966   2 Sheets-Sheet 2

United States Patent Office
3,399,533
Patented Sept. 3, 1968

3,399,533
VENTED HYDRAULIC COUPLING
John E. Becker, Bowmanville, Ontario, Canada, assignor to Eclipse Consultants Limited, Oshawa, Ontario, Canada
Continuation-in-part of application Ser. No. 515,502, Dec. 21, 1965. This application Nov. 4, 1966, Ser. No. 592,023
5 Claims. (Cl. 60—54)

This application is a continuation-in-part of my application No. 515,502, filed Dec. 21, 1965, now abandoned.

This invention is concerned with improvements in or relating to hydraulic couplings, of the kind comprising a pump element and a turbine element (sometimes known respectively as an impeller element and a runner element), each provided with a plurality of radially-extending vortex-producing vanes, the interiors of the elements together forming a working chamber containing a quantity of working liquid, usually an oil, and the two elements being coupled together for the transmission of torque between them by liquid vortices that are established in the working chamber between the said vanes Hydraulic couplings are commonly employed in power transmission systems between a prime mover, such as an internal combustion engine or an electric motor, and a load to be driven by the prime mover. In an ideal arrangement the torque transmitted by the coupling is negligible while the prime mover is idling and increases smoothly and progressively to a maximum when the prime mover reaches its designed optimum speed range; if at any time the coupling output member is overloaded or stalled, the maximum torque that can be transmitted by the coupling is automatically limited to a value such that the prime mover continues to run within its optimum speed range, at which it is supplying its maximum available output torque.

Even when operating at maximum efficiency the two coupling elements must slip relative to one another, usually about 2–5%, to maintain the vortices, the power that is lost being dissipated in the form of heat in the working fluid, from which it is transmitted to the coupling structure, and to the cooling means that are usually provided. If the coupling is subjected to an overload then the slip is increased, increasing the heat produced in the coupling, and if the load is completely stalled then substantially all of the power produced by the prime mover must be dissipated by the coupling.

It will be seen therefore that even with the normal operation of a coupling the working liquid is subjected to mechanical churning between the relatively moving vanes, and moreover may be heated to relatively high temperatures, both of which conditions tend to cause generation of gas and/or vapour, with the consequent production of high internal pressures in the coupling. It has not been unknown for couplings to explode as a result of these internal pressures. In general, in coupling constructions known to me hitherto, no practical way appears to have been found of venting the coupling interior to the ambient atmosphere, and the usual solution appears to have been to make the coupling sufficiently strong to withstand the pressures encountered in normal operation, so that couplings are regarded as being necessarily heavy and expensive. The more severe conditions of a lengthy complete stall commonly are met by the provision of pressure relief valves which open at a predetermined high internal pressure and discharge the whole contents of the working chamber to another vented chamber, or by the provision of a fusible plug which melts when the working fluid becomes too hot, and allows it to escape from the working chamber.

It is an object of the present invention to provide a new hydraulic coupling with which the interior of the working chamber can be vented to the ambient atmosphere while the coupling is in operation.

It is another object to provide such a new coupling that is of lighter mechanical construction than corresponding couplings known hitherto.

In accordance with the present invention there is provided a hydraulic coupling comprising power input and power output means, a pump element and a turbine element connected respectively to the power input and power output means for rotation therewith about a common axis and providing respectively cooperating pump and turbine chambers, said chambers together forming a working chamber which is of generally elliptical cross-section in a plane containing said common axis and which has an interior wall of generally elliptical shape in the said plane, the minor elliptical axes of the said cross-section and of the said interior wall extending generally parallel to the said common axis, a plurality of radially-extending vortex-producing vanes in each of the pump and turbine chambers, a quantity of working liquid in the said working chamber, the eccentricity of the said elliptical cross-section and the said elliptical shape being such that under operating conditions in which the pump and turbine elements are rotating together with normal slip between them there is established in the radially outer portion of the working chamber normal liquid vortices of generally circular cross-section in the said plane, and under overload or stall conditions in which there is greater than the said normal slip between the pump and turbine elements there is established against the said interior wall attenuated liquid vortices of corresponding shape, so that there exists in the said working chamber an annular volume that is not occupied either by the said normal vortices or the said attenuated vortices, vent means carried by the said pump element providing a vent bore having an inlet opening into the said annular volume and an outlet opening to the exterior of the working chamber, and a valve closing the said bore against passage of liquid therethrough while the pump element is stationary and opening the said bore when the pump element is rotating at more than a predetermined minimum speed.

Preferably the said valve is opened by centrifugal force acting against a biasing force.

Figure 2:
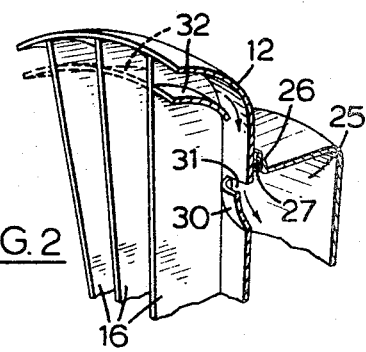
Figure 3:
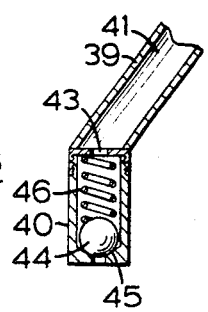
Figure 4:
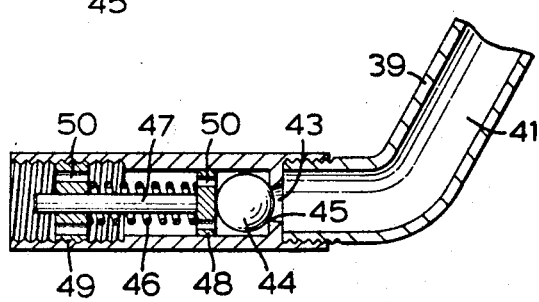
Figure 5:
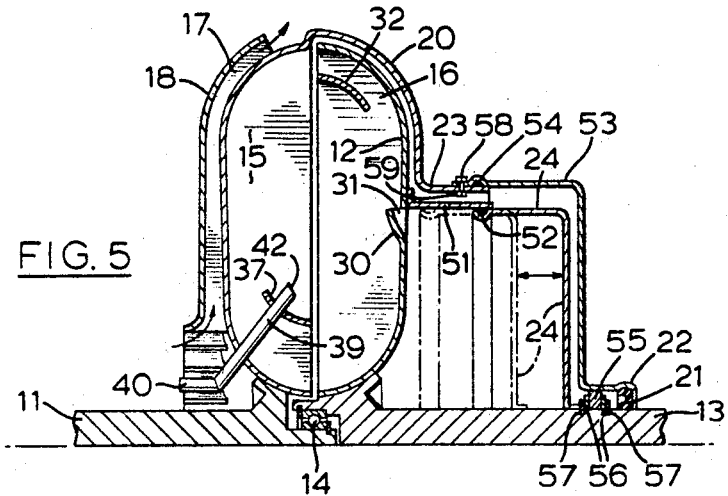
Figure 6:
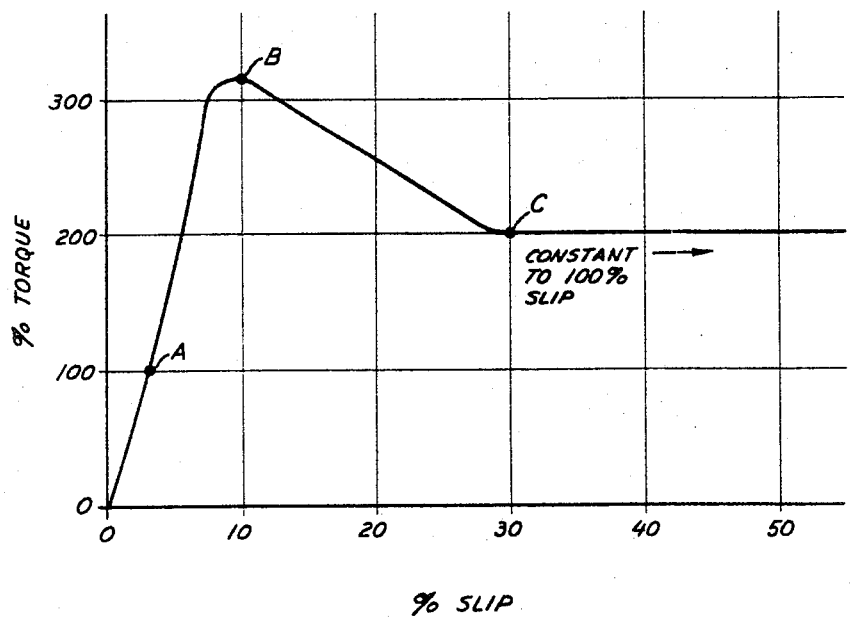

Particular preferred embodiments will now be described, by way of example, with reference to the accompanying diagrammatic drawing, wherein:

FIGURE 1 is a part-elevation, part-sectional view of a first embodiment, the upper part of the figure being a plane cross-section taken along the axis of rotation of the coupling, FIGURE 2 is a perspective view of a portion of the coupling to show the arrangement of a catch means and its associated cooperating liquid directing means, FIGURES 3 and 4 are cross-sections through two different types of valve construction for use with the coupling, FIGURE 5 is a partial view, similar to FIGURE 1, of another embodiment having a reservoir of adjustable volume, and FIGURE 6 is a graph illustrating the operation of a coupling in accordance with the invention.

Similar parts are given the same reference in all the figures of the drawing.

The couplings illustrated herein comprise a pump element 10 mounted on a power input shaft 11 that is adapted to be connected to a prime mover, such as an internal combustion engine or an electric motor, and a turbine element 12 mounted on a power output shaft 13, that is adapted to be connected to apparatus to be driven via the coupling. The immediately adjacent inner ends of the two shafts 11 and 13 are mutually supported by a single ball bearing 14, the inner bearing race being mounted on a spigot on the end of the shaft 11 while the outer bearing race is mounted in a bore in the shaft 13, the two coupling elements being rotatable about a common axis A—A. The interiors of the two elements constitute respectively a pump chamber and a turbine chamber, these two chambers together forming the usual toroidal-shaped working chamber which contains a quantity of working liquid, usually an oil. Each chamber is provided with the usual radially-extending, vortex-producing vanes 15 and 16 respectively. A plurality of radially-extending, air-moving vanes 17 are mounted on the exterior wall of the pump element 10, between the said exterior wall and a shroud member 18; as the pump element rotates cooling air is moved by the centrifugal action of the vanes over the outer surface of the pump element in the direction of the arrows 19. An extension 20 of the pump element surrounds the turbine element in known manner to retain the working liquid in the coupling, a sealing element 21 providing a rotatable, fluid-tight joint between the axially-extending, radially-inner end 22 of the extension 20, and the adjacent portion of the shaft 13. The extension 20 is provided with a toroidal-shaped enlargement 23 to accommodate a reservoir member 24 carried by the turbine element.

The cross-section of the toroidal working chamber in a plane containing the said common axis of rotation of the two elements is an ellipse, with the major axis generally perpendicular to the axis A—A, and the minor axis generally parallel thereto. The inner wall of the chamber is therefore also of elliptical shape in the said plane.

Referring now specifically to FIGURE 1, a liquid reservoir 25 associated with the turbine element is of annular cross-section and is formed between the outer wall of the element and the member 24, which is generally cup-shaped and surrounds the turbine shaft 13. In the embodiment illustrated this member is a simple thin sheet metal stamping having its radially-outer end 26 shaped to embrace between itself and the adjacent turbine element outer wall a sealing O-ring 27, while its radially inner part 28 is turned to extend axially along the shaft 13 and thereby locate the member 25 radially. The member 24 is located axially by its engagement between the turbine element wall and a snap ring 29 on the shaft 13, the shape of the member 24 and the location of the snap ring being such that the former must be stressed in the axial direction to enable the snap ring to be fitted on the shaft, and thereafter the ring and the member will be held in firm engagement with one another by the resilience of the material of the member. It will be seen that the member 24 is not fastened to the element 12 and in fact no such fastening is required.

The turbine element is provided at a radially extending part of its wall with a plurality of catches 30 which extend into the working chamber, so as to intercept liquid flowing along the inner wall of the element, each catch delivering such liquid through an associated bore 31 in the element wall to the interior of the reservoir 25. The choice of location of such catches in the turbine element wall will be discussed in detail below.

Each catch means is located between two immediately adjacent vanes 16 and, in a typical embodiment, a coupling having fifty such vanes in each element may have five catches equally spaced around the turbine element wall. Each catch has associated therewith liquid directing means disposed at the entry to the turbine element for liquid from the pump element, and in this particular embodiment, each liquid directing means comprises a passageway formed by a director plate 32 extending between the associated immediately adjacent pair of vanes and also extending generally coextensively with the adjacent radially outermost part of the turbine element wall. The passage formed by the plate extends sufficiently far in the direction toward the associated catch means that under stall conditions the passage can form the entering liquid into a stream that is positively directed against the element inner wall and toward the catch, while it does not extend so far that it will interfere with the vortex circulation under normal operating conditions.

In this embodiment each plate 32 extends the full axial depth of the turbine chamber and only extends radially inwardly the corresponding amount necessitated by its coextension with the adjacent part of the turbine wall. In other embodiments the plates may extend radially inwardly somewhat more than is illustrated, but passages of the extent shown have been found in practice to be effective for their intended purpose.

In other embodiments moreover, additional plates 32 may be provided between each immediately adjacent pair of vanes to improve the flow of liquid of all the attenuated vortices, and not only those which impinge upon one of the catch means 30. Such additional plates 32 are indicated in FIGURE 2 in broken lines.

In the operation of the coupling, with both elements at rest the working liquid drains under gravity to the lowermost part of the working chamber. As the pump element rotates the liquid is distributed around the chambers and the vortices which transfer the power between the two elements are quickly established, so that driving torque is applied to the turbine element, causing the turbine to rotate and to empty the reservoir under the action of centrifugal force through the bores 31. Under normal operating conditions (i.e. normal operating speed, normal load and about 2–3% slip), these vortices are established in the radially outermost part of the working chamber, and are of approximately circular cross-section in a plane containing the said axis A—A, having a boundary as indicated by the broken line 33 in FIGURE 1, the liquid forming these vortices flowing generally in the direction of the arrows 34. It will be seen that these vortices are clear of the catches 30, so that under these conditions there is no transfer of working liquid to the reservoir.

If the turbine element is now stalled or overloaded, so that there is an appreciable increase in slip between the elements, the vortices begin to elongate radially inwards toward the axis A—A and at a critical amount of slip, depending upon the particular coupling design, to be discussed in more detail below, they become completely disrupted and the liquid flows over the interior wall of the working chamber. When the vortices have elongated sufficiently to be intercepted by the catches 30, the latter will commence to transfer liquid to the reservoir, this transfer becoming progressively more efficient, until it reaches a maximum and the reservoir rapidly fills with liquid. At this point the turbine element is stationary or is moving so slowly that there is insufficient centrifugal emptying force to prevent this filling.

Liquid vortices are still established by the liquid flowing over the interior coupling walls, but the volume of liquid available to form them is reduced by the volume that has entered the reservoir, and their radial length is substantially increased, so that they are of what is called herein of "attenuated" form, being of generally hollow elliptical cross-section in the said plane, as indicated by the solid line 35 in FIGURE 1, the liquid flowing as indicated by the arrows 36. By suitable choice of the dimensions of the working chamber with respect to the volume of the reservoir and the volume of working liquid employed, the attenuated vortices can be arranged to be capable of transmitting only the normal maximum output torque of the prime mover and for which the coupling was designed, so that the prime mover can continue to operate at an optimum speed at which it is producing the said normal maximum torque.

If the condition causing the overload or stall is subsequently corrected, the turbine element again begins to rotate causing flow of the working liquid under centrifugal force back into the working circuit and the rapid reestablishment of the normal liquid vortices. A similar effect is obtained if the prime mover is started under a substantial overload; thus the first effect of rotation of the pump element is to cause the liquid to flow over the element interior surfaces, with subsequent rapid filling of the reservoir and establishment of the attenuated vortices if the turbine element does not rotate, or rotates with high slip between the elements. The attenuated vortices will remain until the turbine element speed increases sufficiently for the normal vortices to be established.

The pump element also is provided with liquid directing means, disposed at the radially inner entry part thereof, and comprising passageways formed by director plates 37, each plate extending between an associated immediately adjacent pair of vanes. Preferably, all of the spaces between the vanes are provided with such plates, which also extend generally coextensively with the adjacent radially innermost part of the pump element wall. In this embodiment the plates extend the full axial depth of the pump chamber and only extend radially inwardly the corresponding amount necessitated by the said coextension with the inner wall, and plates of this form have been found in practice to be effective for their intended purpose. The passages formed by the plates 37 extend sufficiently far into the pump element that, under the said stall conditions, they form the entering liquid constituting the attenuated vortices into corresponding streams that are positively directed along and generally parallel to the pump element inner wall. The location and extent of the plates 37 is such that under the said normal operating conditions they are clear of the normal vortices and therefore are not operative.

The design and location of the catch means 30 and of the liquid director means 32 and 37 are interrelated with one another, since they cooperate in achieving smooth and effective transfer of liquid from the working circuit to the reservoir. Under stall or overload conditions the liquid layer forming each attenuated vortex is so shallow, particularly at the radially-outermost part of the coupling, that in the absence of the respective director means the layers of liquid tend to be deflected along the faces of the vanes radially inwards, instead of following the contour of the respective chamber. The provision of the director means 32 at the entry to the turbine element ensures that at stall the liquid is not so deflected, but is directed to the catches generally parallel to the turbine element inner wall, and more nearly in the form of a coherent stream that can be transferred efficiently thereby to the reservoir.

The location of the catches on the radially-extending portion of the turbine element largely determines the flatness of the characteristic curve of percent torque versus percent slip. If they are located very close to the normal vortices they will begin to be effective almost immediately upon an increase in the slip, while they will not be effective until the attenuated vortices are fully established if located at or near the radially-innermost part of the coupling. In the embodiment illustrated the catches are located sufficiently close to become effective upon the presence of about 12% slip, corresponding to a torque transmission capacity of about 2.8 times the normal operating torque capacity for which the coupling is designed. It will be found that the shape of the catches 30 can be made to have a determining effect upon the said characteristic curve; thus the apertures 31 can be fixed in position and the curve changed as required by changing the radial length of the catches. In such a construction long catches will result in a relatively rapid decrease in torque transmission with slip, while short catches will result in a less rapid decrease.

The graph of FIGURE 6 shows the characteristic that can be obtained by suitable design of the coupling. At point A, corresponding to the 3% slip obtained under normal conditions the coupling can transmit 100% of the required torque. At point B corresponding to about 10% slip the maximum torque transmitting capacity of about 315% is obtained; thereafter the reservoir fills until point C, corresponding in this embodiment to about 30% slip and about 200% torque transmission capacity, is reached, and the torque transmission capacity has decreased to its new value, remaining substantially constant at this new value. It will be seen that the size of the reservoir can be made to result in torque transmission capacities at stall or start to conform with the overload capacity of the electric motor or internal combustion engine constituting the power source. The ability of the coupling to substantially increase its torque capacity with increasing slip in the low slip ranges is of considerable advantage; in that if an overload begins to build up the slip will increase and, as shown in the graph, the torque transmission capacity will become substantially larger, thus enabling it to take advantage of the overload capacity of the motor and to be able to struggle with and overcome the overload, instead of permitting the output shaft to slow down considerably and possibly stall.

In the embodiment illustrated the spacing between each plate 32 and the turbine element inner wall increases progressively radially inwards to compensate for the convergence between the associated radial vanes and to maintain the passage of substantially constant cross-sectional area, but in other embodiments the cross-sectional area may increase and/or decrease in this direction to provide directing means that cooperate as desired with the catch means. The passageway may be constituted by means other than the director plate illustrated, for example, by a tube of the required shape that is fixed inside the turbine element with its inlet and outlet at the required locations.

Similarly, the spacing between each plate 37 and the pump element inner wall decreases progressively radially outwards to maintain the respective passage of substantially constant cross-sectional area, but in other embodiments this area may increase and/or decrease to provide director means of a desired characteristic. This director means may also be constituted by means other than the specific director plate illustrated.

By providing the directing means in both the turbine and pump elements a solid stream of fluid is created at starting or under stall conditions and the otherwise uncontrollable splashing and spraying is avoided. It is therefore possible to calculate the radial thickness of the stream and make the distance $d$ such that the stream passes freely between the director and the inner turbine surface, and yet not so large that substantial splashing occurs again.

The shape of the directing means in the turbine is such that it conforms to the fluid vortex path at a distance $d'$ from the midpoint M of the vortex under normal operating conditions so that the directing means does not interfere with the flow of the normal vortex. Since the inner contour of the pump and turbine chambers is known, as well as the amount of fluid required for certain working conditions and coupling dimensions, the position of the mid-point M can be accurately calculated. The length of the directing means, measured along the fluid vortex path, has to be such that the fluid entering the stalled (or very slowly rotating) turbine element cannot splash or be deflected along the face of the vane and thus prevent the formation of a solid stream. The distance $d^2$ from the inner pump surface for the corresponding director means can also be accurately determined because the thickness of the fluid stream at this point is also known.

As described above, the working chamber is of generally elliptical cross-section in the plane containing the axis A—A, with the minor axis generally parallel to the said axis. An annular volume of the chamber, indicated in FIGURE 1 by the reference 38 and outlined by chain-dotted line, is not occupied either by the normal or the attenuated vortices, and it is therefore possible to provide vent means, carried by the pump element and venting the interior of the coupling to the ambient atmosphere surrounding the coupling, by arranging that the inlet to the vent means is located in this annular volume 38. As illustrated, the vent means for this embodiment comprise a vent tube 39 mounted in the wall of the pump element 10 and having a centrifugally opened valve 40 at its outer end. Referring especially to FIGURES 3 and 4, the tube 39 provides a vent bore 41 that has its inlet 42 opening into the annular volume 38, and its outlet 43 opening via the valve 40 to the ambient atmosphere.

The valve 40 may be as shown in FIGURE 3, comprising a ball 44 that is closed against a seat 45 by a spring 46 while the pump element is rotating at less than a predetermined speed, its purpose being to prevent the escape of the working fluid from the coupling via the vent tube, whenever the pump element comes to rest with the tube inlet 42 below the level of the working liquid. As the pump element begins to rotate any fluid in the tube 39 is returned to the coupling by centrifugal force, so that there is no fluid left therein by the time that the pump speed is sufficient for the valve to be opened by centrifugal force moving the ball against the bias of the spring 46. Immediately the valve is open the interior of the coupling is vented to permit the escape therefrom of gases and/or vapour under pressure. The rotational speed of the pump element at which the valve opens and closes is not critical, but must be less than the speeds that are obtained when the turbine element is operating under the most severe conditions encountered, namely a complete stall thereof.

It will be seen therefore that in designing the coupling the possibility of high internal pressures need not be considered, so that there is a corresponding reduction in the need for walls of sufficient thickness to withstand such pressures and/or for the provision of the above mentioned fusible plugs. Many sizes of hydraulic couplings, which hitherto have required cast or machined pump and turbine elements to achieve the strength necessary to avoid the possibility of disruption or explosion by internal pressure, can therefore be manufactured using instead stamped or pressed elements of relatively thin sheet metal, with a consequent substantial reduction in weight and manufacturing cost. It may also be noted that the use of thin metal casings permits the catches 30 to be formed readily by striking them directly out of the metal of the turbine element.

FIGURE 4 shows another form of centrifugally operated valve that preferably is employed in place of that illustrated in FIGURE 3. In this other form the ball 44 is interposed between the seat 45 and a plunger 47 having a head 48 that is urged into contact with the ball by the spring 46. The longitudinal axes of the plunger and the spring are disposed generally parallel to the common axis of rotation of the coupling, the ball moving radially outwards perpendicular to said common axis under the effect of the centrifugal force, and both the ball and the plunger 47 moving longitudinally against the opposing bias of the plunger and spring. With such an arrangement the effect of centrifugal force on the spring can be neglected in calculating the rotational speed required to open the valve to the required extent. Adjustment of the spring pressure is obtained by adjustment of the position of a stop member 49 against which the spring 46 bears. The head 48 and the stop member 49 are provided with bores 50 through which gas and/or vapour pass in escaping from the coupling interior via the vent means and the valve 40.

In the embodiment illustrated the vent tube 39 has its outlet via the valve 40 discharging directly to the ambient atmosphere, and in the coupling constructed and tested such an arrangement is found to be very practical, there being no escape of working liquid from the coupling along this path. However, in other embodiments it may be preferred to instead vent the coupling interior to a compartment or chamber of the coupling that is in turn permanently vented in this manner to the ambient atmosphere.

In the coupling illustrated by FIGURE 5 the volume of the reservoir 24 can be varied as required to set the torque capacity of the coupling at stall. The advantages of such an arrangement will be apparent to those skilled in the art, in that the volume required for the reservoir can be accurately adjusted subsequent to manufacture to cover a wide range of stall torque capacities and a wide range of corresponding ratios of normal torque capacity to stall torque capacity.

Specifically, the casing forming the reservoir 25 comprises a cup-shaped member 24, corresponding to the member 24 shown in FIGURE 1, telescoping within a tubular axially-extending member 51 fixed to the turbine element outer wall. The joint between the two members is sealed by an annular bead 52 of suitable elastomeric material that is compressed radially between the two members. Similarly, the immediately adjacent part of the pump element extension 20 is divided into two telescoping parts 23 and 53, the joint being sealed by an annular bead 54 of a suitable elastomeric material. A bronze ring 55 surrounds the shaft 13 and centres the adjacent end 22 of the part 53, the ring being retained between two steel washers 56 that are in turn retained on the shaft 13 by snap rings 57, the end 28 of the member 24 abutting the immediately adjacent snap ring. The two parts 23 and 53 are held fixed in position relative to one another by a plurality of self-locking leak-proof screws, such as 58, spaced circumferentially around the parts 23 and 53 and engaging respective nuts 59 secured (as by brazing) to the inner surface of the part 23.

The volume of the reservoir 25 is determined by the relative axial positions of the members 53 and 24, and the position of the latter is set by the stop rings 57. The position of the members 53 is adjusted simultaneously with the position of the member 24, so that the space between the reservoir exterior and the interior of the extension 23 is maintained at a minimum. When the coupling is operating normally the reservoir is empty and at stall, when the reservoir is full, it is also stationary, or nearly so, so that the seal is only subjected to the weight of the contained liquid, which is negligible.

What we claim is:

1. A hydraulic coupling comprising power input and power output means, a pump element and a turbine element connected respectively to the power input and power output means for rotation therewith about a common axis and providing respectively cooperating pump and turbine chambers, said chambers together forming a working chamber which is of generally elliptical cross-section in a plane containing said common axis and which has an interior wall of generally elliptical shape in the said plane, the minor elliptical axes of the said cross-section and of the said interior wall extending generally parallel to the said common axis, a plurality of radially-extending vortex-producing vanes in each of the pump and turbine chambers, a quantity of working liquid in the said working chamber, the eccentricity of the said elliptical cross-section and the said elliptical shape being such that under operating conditions in which the pump and turbine elements are rotating together with normal slip between them there is established in the radially outer portion of the working chamber normal liquid vortices of generally circular cross-section in the said plane, and under overload or stall conditions in which there is greater than said normal slip between the pump and turbine elements there is established against the said interior wall attenuated liquid vortices of corresponding shape, so that there exists in the said working chamber an annular volume that is not occupied by either the said normal vortices or the said attenuated vortices, vent means carried by the said pump element providing a vent bore having an inlet opening into the said annular volume and an outlet opening to the exterior of the working chamber.

2. A hydraulic coupling as claimed in claim 1, and comprising a valve closing the said bore against passage of liquid therethrough while the pump element is stationary and opening the said bore when the pump element is rotating at more than a predetermined minimum speed.

3. A hydraulic coupling as claimed in claim 2, wherein the said valve is opened by centrifugal force upon rotation of the pump element acting against a biasing force closing the valve.

4. A hydraulic coupling as claimed in claim 1, wherein the said vent means comprise a vent tube protruding through the wall of the pump element and carried thereby, the inlet end of the tube opening into the said annular volume and the other outlet end of the tube opening to the atmosphere surrounding the coupling.

5. A hydraulic coupling as claimed in claim 4, and comprising a valve closing the said bore against passage of liquid therethrough while the pump element is stationary and opening the said bore when the pump element is rotating at more than a predetermined minimum speed, wherein the said valve is disposed at the said outlet end of the tube and is opened by centrifugal force upon rotation of the pump element acting against a biasing force closing the valve.

References Cited
UNITED STATES PATENTS

| | | | |
|---|---|---|---|
| 2,875,581 | 3/1959 | Kugel | 60—54 |
| 3,145,535 | 8/1964 | Schneider | 60—54 |

EDGAR W. GEOGHEGAN, *Primary Examiner.*